Feb. 26, 1929.  E. H. SMITH  1,703,180
FLUID CONTROL VALVE
Filed Jan. 31, 1927  2 Sheets-Sheet 1
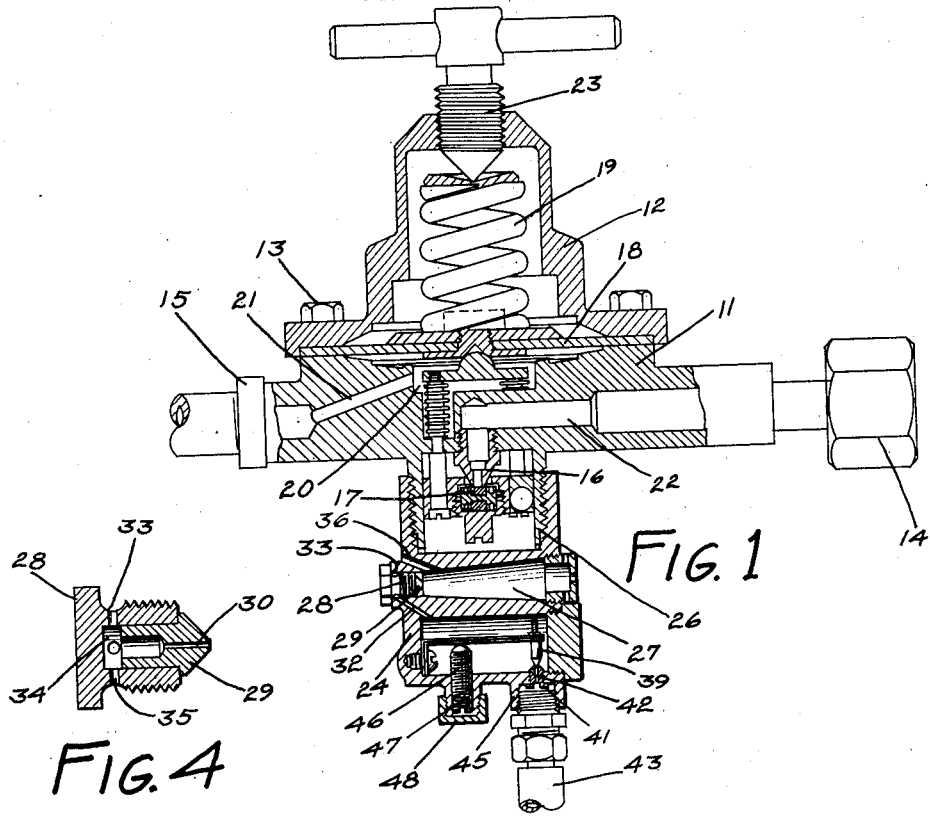
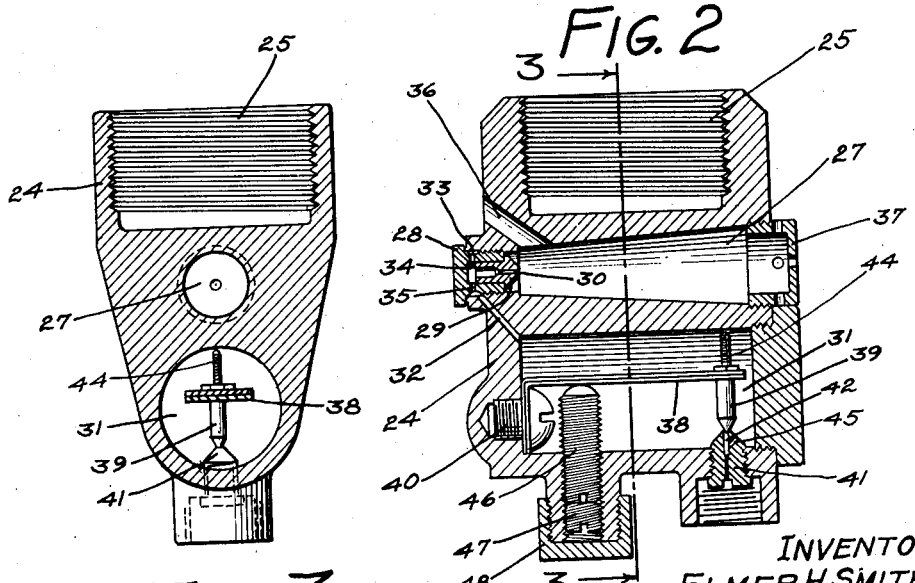
INVENTOR
ELMER H. SMITH
BY Paul, Paul & Moore
ATTORNEYS Feb. 26, 1929.  E. H. SMITH  1,703,180

FLUID CONTROL VALVE

Filed Jan. 31, 1927  2 Sheets-Sheet 2

INVENTOR
ELMER H. SMITH

ATTORNEYS

Patented Feb. 26, 1929.

1,703,180

UNITED STATES PATENT OFFICE.

ELMER H. SMITH, OF MINNEAPOLIS, MINNESOTA.

FLUID-CONTROL VALVE.

Application filed January 31, 1927. Serial No. 164,797.

This invention relates to improvements in fluid pressure control valves and more particularly relates to an anti-freezing attachment for such a valve, having a combustion chamber therein connected with a source of fuel supply and which attachment is connected to the pressure valve in such a manner that when functioning it will warm or heat the pressure valve to prevent the fluid from congealing or freezing therein, in extremely cold weather.

An object of the invention is to provide a warming or heating device having means for attaching it to a fluid pressure control valve, of ordinary construction, and which may readily be removed therefrom and the valve used in the ordinary manner during warm weather.

A more specific object of the invention is to provide a warming device or anti-freezing attachment adapted for use in connection with a fluid pressure valve to prevent the fluid therein from freezing and thus rendering the intricate valve mechanism thereof inoperative, said device comprising a combustion chamber having a connection with a fuel supply and further having a thermal-element arranged therein adapted automatically to interrupt combustion, when the device is heated to a predetermined temperature, and which element will automatically open the fuel duct to the supply of fuel, when the temperature of the device drops to a predetermined degree, thereby providing such a warming device adapted automatically to maintain a portion of the valve casing or a portion thereof at a non-freezing temperature.

Other objects of the invention will appear from the following description and accompanying drawings and will be pointed out in the annexed claims.

In the drawings there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1 is a sectional view of a fluid pressure control valve showing my improved warming device attached thereto;

Figure 2 is an enlarged detailed sectional view of the device;

Figure 3 is a detailed sectional view on the line 3—3 of Figure 2;

Figure 4 is an enlarged detailed sectional view showing the general construction of the nozzle;

Figure 5:
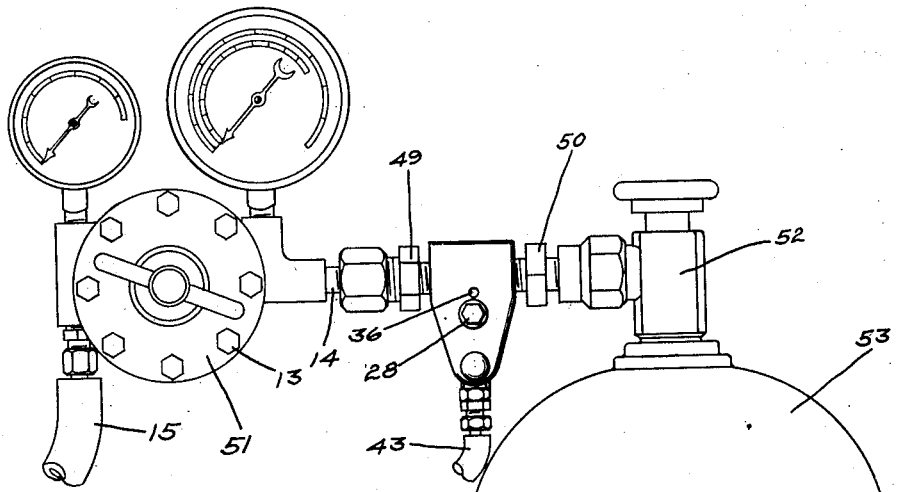
Figure 6:
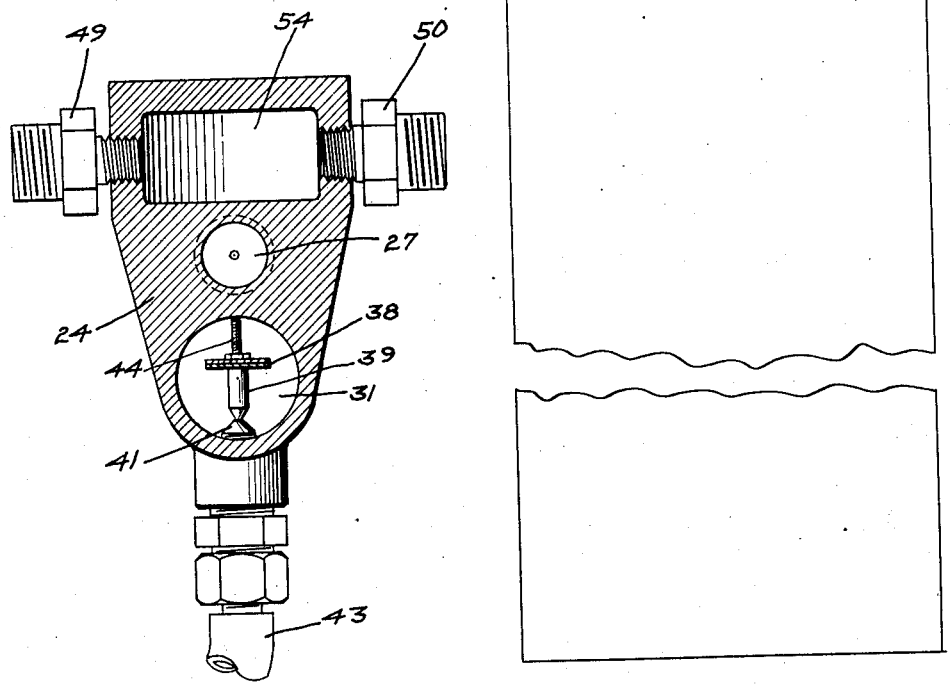

Figure 5 is a side elevation of a fluid supply tank having a pressure valve connected therewith, and showing the warming device interposed in the connection between the tank and the pressure valve, the type of warming device shown in this figure being a modification over the form shown in the previous figures; and Figure 6 is an enlarged detailed sectional view of the modified form shown in Figure 5.

In the selected embodiment of the invention shown, for purposes of disclosure, there is illustrated a conventional fluid pressure regulating valve comprising a body 11 having a hood 12 secured thereto by bolts 13. A connection 14 is provided for connecting the body 11 with a source of high pressure fluid, and an outlet connection 15 is provided at the opposite side of the body for the low pressure fluid. The pressure regulating mechanism of the valve is of ordinary construction and comprises a nozzle 16 normally engaged with a seat 17 movable by means of a diaphragm 18, having a spring 19 engaged therewith, tending normally to force the diaphragm downwardly to move the seat 17 out of engagement with the tip of the nozzle 16 to permit the entrance of high pressure fluid into the valve beneath the diaphragm 18. It is to be understood that the chamber encircling the nozzle 16 is in communication with the chamber 20, directly beneath the diaphragm. A duct 21 connects the chamber 20 with the connection 15 and a relatively larger duct 22 connects the nozzle 16 with the intake connection 14 as shown in Figure 1. The purpose of the diaphragm is to regulate the resultant pressure of the fluid flowing through the connection 15. This is accomplished by the action of the spring-actuated diaphragm 18, the yieldable action of which is adjustable by means of the adjusting screw 23, mounted in the upper portion of the bonnet 12.

A feature of this invention resides in the novel means provided for preventing the regulating valve from becoming inoperative as a result of water or moisture congealing or freezing therein when used in cold weather. Such congealing of the fluid in the regulating valve renders the latter inoperative for use and it is therefore desirable and essential that means be provided for preventing the fluid from thus congealing when the regulating valve is used out of doors in cold weather.

The novel warming device set forth in this application comprises a body portion 24 having a threaded socket 25 adapted to be engaged with the threaded extension 26 of the regulating valve as shown in Figure 1. It will be noted by reference to this figure, that the extension 26 is bored to slidably receive the valve mechanism in the lower portion of the valve. A combustion chamber 27 is provided in the casing 24 and has a fuel supply nozzle 28 demountably secured at one end thereof, as shown in Figures 1 and 2. The nozzle 28 has a tip 29 removably mounted therein having a small orifice 30 which communicates at one end with the combustion chamber 27 and having its other end communicating with a bore 31 by means of a duct 32. The nozzle 28 is provided with an annular groove 33 which communicates with the duct 32 and with a bore 34 in the nozzle by means of ducts 35. An air duct 36 is provided at the fuel-receiving end of the combustion chamber for supplying air thereto. An apertured cap 37 is removably mounted at the opposite end of the combustion chamber 27 to provide a closure therefore, and at the same time to permit the gases of combustion to escape from the combustion chamber 27.

In the chamber 31 is mounted a thermal element 38 having a valve stem 39 adjustably secured to the flexing end thereof. The opposite end of the thermal element is secured to the wall of the body 24 by such means as the screw 40. The lower conical end of the valve stem 39 is adapted to be moved in and out of engagement with a nozzle 41, having a central orifice 42 therein communicating with a flexible connection 43 which has its other end connected with a source of fuel supply. The valve stem 39 is provided with an extension 44 adapted to engage the upper wall of the bore 31 to limit the upward movement of the valve stem 39. The movement of the valve stem 39 is such that the tip or point of the stem 39 will always be partially inserted in the orifice 42 in the fuel supply nozzle 41, although when moved away therefrom to valve-opening position, it will permit ample flow of fuel into the chamber 31 and therefore to the combustion chamber 37.

A comparatively small auxiliary duct 45 is provided in the fuel supply nozzle 41 which is adapted to constantly admit a small portion of fuel into the chamber 41 for the purpose of maintaining a pilot light flame in the combustion chamber 27. Thus, when the valve 39 is seated against the tip 41, a small portion of fuel will enter the chamber 31 through the duct 45 to maintain a pilot flame in the combustion chamber 37. It will readily be seen that when the bore 31 is heated to a predetermined temperature, the thermal-element will flex downwardly to seat the valve 39, but the pilot flame or light will continue to function, and, when the bore 31 cools, the thermal-element will open the valve after which fuel will be supplied to the combustion chamber 27 and combustion will immediately take place. The operation of the heating device is therefore automatic, in that fuel is supplied thereto and cut off therefrom by the action of the thermal-element 38, responsive to temperature changes in the bore 31. An adjusting screw 46 is mounted in the lower wall of the casing 24 to adjust the valve stem 39 relative to the fuel nozzle 41. This adjusting screw is locked in adjusted positions by a lock screw 47 concealed by a cap 48, shown in Figures 1 and 2.

Figures 5 and 6 illustrate a modified form wherein the heating device is interposed between the connections 49 and 50, connecting the regulating valve 51 with the valve outlet 52 of the fluid pressure tank 53. In the form here shown, the casing of the pressure valve is not heated as shown and described with reference to Figures 1 to 4, inclusive, but to prevent freezing of the fluid in the regulating valve, the fluid is warmed or heated before being delivered to the valve 51, thus preventing its from congealing therein.

To thus warm or heat the fluid before it is delivered to the pressure valve, a chamber 54 is provided in the upper portion of the body 24 of the heating device and is connected in series with the connections 49 and 50, connecting the regulating valve to the tank 53. This chamber 54 is heated to a predetermined temperature as a result of combustion taking place in the combustion chamber 27, arranged directly therebeneath as shown in Figure 6. The mechanism for automatically controlling the supply of fuel to the combustion chamber 27 is similar to that shown and described with reference to the previous figures and like parts are therefore indicated by like numerals.

I claim as my invention:

1. The combination with a fluid pressure regulating valve, comprising a casing having a lateral extension and a valve mechanism mounted in said extension of a warming device comprising a body provided with means for demountably securing it to said extension, said warming device having a heating means therein adapted automatically to maintain a portion of said valve casing extension at a predetermined temperature.

2. The combination with a fluid pressure regulating valve comprising a casing having a valve mechanism therein, of a heating device comprising a body adapted to be secured to said casing and to transmit heat thereto to prevent congealing of the fluid in the casing when the valve is used in a freezing temperature, said device having means for connecting it with a source of combustible gas.

3. A device of the class described, comprising a body, a combustion chamber therein, an air supply duct for the chamber, a bore in the body beneath the combustion chamber, a duct connecting the bore with the combustion chamber, a fuel supply duct connected with the bore and a thermal-element responsive to temperature changes to control the supply of fuel to the combustion chamber.

4. A device of the class described, comprising a body, a combustion chamber therein, a bore beneath the combustion chamber, means connecting the combustion chamber with the bore, a fuel supply connected with the bore, and a thermal-element movably mounted within the bore and responsive to temperature changes to automatically control the supply of fuel to the combustion chamber.

5. A device of the class described, comprising a body having a threaded socket adapted to be engaged with a valve casing, a combustion chamber beneath said socket, a nozzle mounted at the small end of the combustion chamber, a perforated cap at the opposite end of the chamber, a cylindrical bore beneath the combustion chamber, a duct connecting the bore with the chamber, a fuel supply nozzle in the wall of said bore, and a thermostatically operable valve stem engageable with said fuel nozzle to control the supply of fuel for the combustion chamber.

6. A device of the class described, comprising a body having a threaded socket in the upper portion thereof adapted to be engaged with a valve casing, a tapered combustion chamber beneath said socket, a nozzle for delivering fuel to the combustion chamber, a perforated cap at the opposite end of the chamber, a cylindrical bore beneath the combustion chamber, a duct connecting the bore with the chamber, a fuel supply nozzle in the wall of said bore, a thermostatically movable valve stem engageable with said fuel nozzle to control the flow of fuel therethrough, and an auxiliary orifice in said nozzle permitting the entrance of fuel into said bore to constantly maintain a pilot flame in the combustion chamber, when said valve stem is in closed position.

In witness whereof, I have hereunto set my hand this 28th day of January, 1927.

ELMER H. SMITH.